(12) United States Patent
Escott et al.

(10) Patent No.: US 8,473,002 B2
(45) Date of Patent: Jun. 25, 2013

(54) METHOD AND APPARATUS FOR NETWORK PERSONALIZATION OF SUBSCRIBER DEVICES

(75) Inventors: Adrian Edward Escott, Reading (GB); Anand Palanigounder, San Diego, CA (US); Brian M. Rosenberg, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 13/091,013

(22) Filed: Apr. 20, 2011

(65) Prior Publication Data

US 2011/0263225 A1 Oct. 27, 2011

Related U.S. Application Data

(60) Provisional application No. 61/327,518, filed on Apr. 23, 2010.

(51) Int. Cl.
*H04W 88/02* (2009.01)

(52) U.S. Cl.
USPC ...................................... 455/552.1

(58) Field of Classification Search
USPC ............ 455/552.1, 411, 450, 456.2; 375/222, 375/260; 709/223
See application file for complete search history.

(56) References Cited

U.S. PATENT DOCUMENTS

| | | | |
|---|---|---|---|
| 6,591,095 B1 | 7/2003 | Palaniswamy et al. | |
| 6,816,900 B1 | 11/2004 | Vogel et al. | |
| 8,032,409 B1 * | 10/2011 | Mikurak | 705/14.39 |
| 2001/0034834 A1 * | 10/2001 | Matsuyama et al. | 713/156 |
| 2005/0273610 A1 | 12/2005 | Kaneda | |
| 2007/0150737 A1 | 6/2007 | Parupudi et al. | |
| 2012/0209951 A1 * | 8/2012 | Enns et al. | 709/217 |

FOREIGN PATENT DOCUMENTS

EP 1699164 A2 9/2006

OTHER PUBLICATIONS

"3rd Generation Partnership Project; Technical Specification Group Services and System Aspects; Security of Home Node B (HNB) / Home evolved Node B (HeNB) (Release 9 )", 3GPP Standard; 3GPP TS 33.320, 3rd Generation Partnership Project (3GPP), Mobile Competence Centre ; 650, Route Des Lucioles ; F-06921 Sophia-Antipolis Cedex ; France, No. V9.1.0, Mar. 31, 2010, pp. 1-32, XP050402270, [retrieved on Mar. 31, 2010] cited in the application p. 15, line 1-p. 18, line 9.

(Continued)

*Primary Examiner* — Diane Mizrahi
(74) *Attorney, Agent, or Firm* — Won Tae Kim

(57) ABSTRACT

A method and apparatus are provided for a subsidizing service provider entity to personalize a subscriber device to ensure the subscriber device cannot be used in a network of a different service provider entity. As the service provider entity subsidizes the subscriber device, it desires to ensure that subscriber device is personalized such that the subscriber device may operate only in its network and not a network of a different service provider entity. The subscriber device is pre-configured with a plurality of provider-specific and/or unassociated root certificates by the manufacturer of the subscriber device. A communication service is established between the service provider entity and the subscriber device allowing for the mutual authentication of the subscriber device and the service provider entity. After mutual authentication, the service provider entity sends a command to the subscriber device to disable/delete some/all root certificates that are unassociated with the service provider entity.

11 Claims, 15 Drawing Sheets

OTHER PUBLICATIONS

"3rd Generation Partnership Project;Technical Specification Group Terminals;, Runtime Independent Framework Feasibility Study; (Release 6)", 3GPP Standard; 3GPP TR 22.857, 3rd Generation Partnership Project (3GPP), Mobile Competence Centre ; 650, Route Des Lucioles ; F-06921 Sophia-Antipolis Cedex ; France, No. V6.0.0, Dec. 1, 2002, pp. 1-46, XP050361377.

"Femtocell Security Framework", Jan. 28, 2010, pp. 1-36, XP55013850, Retrieved from the Internet: URL:http://www.3gpp2.org/Public_html/specs/S.S0132-0_v1.0_Femto cell_Security Framework.pdf [retrieved on Dec. 5, 2011] cited in the application p. 9, line 1—p. 12, line 3.

International Search Report and Written Opinion—PCT/US2011/033642—ISA/EPO—Dec. 23, 2011.

* cited by examiner

METHOD AND APPARATUS FOR NETWORK PERSONALIZATION OF SUBSCRIBER DEVICES

CLAIM OF PRIORITY UNDER 35 U.S.C. §119

The present application for patent claims priority to U.S. Provisional Application No. 61/327,518 entitled "Method and Apparatus for Network Personalization of Subscriber Devices", filed Apr. 23, 2010, and assigned to the assignee hereof and hereby expressly incorporated by reference herein.

BACKGROUND

1. Field

One feature relates to communication systems, and more particularly, to an improved method for a service provider entity to personalize a subscriber device to ensure the subscriber device cannot be used in a network of a different service provider entity.

2. Background

Mobile network operators (i.e. network entities, service providers or service provider entities) may wish to subsidize subscriber devices, such as femtocells/Home (e) Node Bs (H(e)NB), relays, end-user devices including modems, tablets, and mobile phones. However, many of these emerging subscriber devices may not use smartcards for authentication, but instead may rely on authentication based on device certificates.

A network entity or service provider entity that subsidizes such a device may want to ensure that the subsidized device cannot be used in a network for a different service provider entity. As there is mutual authentication between the subscriber device, such as a femtocell, and the network of the service provider entity (e.g., Security Gateway in the case of femtocells), one way to achieve ensuring that the subsidized device cannot be used in a network for a different service provider entity is by ensuring that the subscriber device will successfully authenticate only to a specific service provider entity. Current methods for accomplishing this provide for the device manufacturer to install a root certificate for only one service provider entity on the subsidized device. Although this will enable a subsidizing service provider entity to ensure the subsidized device cannot be used in a network for a different service provider entity, it creates inefficiencies in the manufacturing process and prevents a subscriber device which was manufactured for one service provider entity from being sold to another, for example in the situation in which an order is cancelled.

Therefore, a system and method are needed that allow a subsidizing service provider entity to ensure a subsidized device cannot be used in a network for a different service provider entity while preventing the current inefficiencies in the manufacturing process.

SUMMARY

Service provider entities (e.g., wireless service provider entities or carriers) that subsidize subscriber devices (e.g., mobile devices) want to ensure that a subsidized device cannot be used in a network for a different service provider entity. To ensure the subscriber device may operate only in its network and not in a network of a different service provider entity, the service provider entity may personalize the subscriber device by disqualifying all pre-configured root certificates stored on the subscriber device that are unassociated with the service provider entity.

One feature provides a method operational on a subscriber device. The subscriber device, pre-configured with a plurality of root certificates, is personalized by a service provider identity. To personalize the subscriber device, a communication service or link with the service provider entity that is providing the subsidization is established. By establishing the communication service or link, mutual authentication of the subscriber device and the service provider entity may then be completed. That is, the subscriber device is authenticated with the service provider entity and the service provider entity is authenticated with the subscriber device. The service provider entity is authenticated using a root certificate from among the plurality of root certificates pre-configured in the subscriber device.

After mutual authentication, the subscriber device may receive a command from the service provider to disqualify all root certificates that are unassociated with the service provider entity. By disqualifying all root certificates on the subscriber device that are not associated with the service provider entity that is subsidizing the subscriber device, the subscriber device may be unable to authenticate with a different service provider entity and thus will not be able to access services offered by different service provider entities.

In response to the command, the subscriber device may then disqualify the root certificates specified by the service provider entity by disabling them. If attempts to disable the unassociated root certificates fail, the subscriber device may then receive a command from the service provider entity to delete the unassociated root certificates. Alternatively, if the subscriber device initially attempts to disqualify the specified root certificates by deleting them and fails, the subscriber device may then receive a command from the service provider entity to attempt to disable them.

Upon the occurrence of a pre-determined event, such as the termination of a service contract between the subscriber device and the service provider entity, the subscriber device may receive an additional command from the service provider entity to enable the specified root certificates that have previously disabled. Alternatively, if the specified root certificates were deleted, the additional command from the service provider entity is to replace the specified root certificates that have been previously deleted.

Another feature provides a subscriber device personalized by a subsidizing service provider entity. The subscriber device may include a processing circuit coupled to a memory device, for storing a plurality of root certificates, and a network communication interface for providing connectivity to the subsidizing service provider entity. A command may then be received from the service provider entity instructing the subscriber device to disqualify specified root certificates stored in the memory device; the specified root certificates are unassociated with the service provider entity. The subscriber device then disqualifies the specified root certificates allowing access to all the services and features offered by service provider entity.

Another feature provides a subscriber device personalized by a subsidizing service provider entity, which subscriber device may include means for establishing a communication service with a service provider entity. The subscriber device may further include means for receiving a command from the service provider entity to disqualify specified root certificates stored in the subscriber device, the specified root certificates unassociated with the service provider entity. Means for disqualifying the specified root certificates may also be included.

Yet another feature provides a computer-readable medium that includes instructions for personalizing a subscriber device by a service provider entity. When executed by a processor, the instructions may cause the processor to establish a communication service with a service provider entity; receive a command from the service provider entity to disqualify specified root certificates stored in the subscriber device, the specified root certificates unassociated with the service provider entity; and disqualify the specified root certificates.

A method operational on a service provider entity is also provided. The service provider entity may subsidize a subscriber device and desire to ensure that the subscriber device may operate only in its network and not in a network of a different service provider entity. To prevent the subscriber device from operating in a different service provider entity network, the service provider entity may personalize the subscriber device by disqualifying all root certificates pre-configured on the subscriber device that are unassociated with the service provider entity.

To personalize the subscriber device, a communication service or link is established with the subscriber device. The communication service may be established, for example, by the subscriber device being turned on or entering the network of the service provider entity. By establishing a communication service or link, mutual authentication of the service provider entity and the subscriber device may then be completed. After mutual authentication, the service provider entity may send a command to the subscriber device to disqualify specified root certificates stored on the subscriber device that are unassociated with the service provider entity.

The service provider entity may command the subscriber device to disqualify the root certificates by disabling them. If disablement of the unassociated root certificates fails, the service provider entity may then command the subscriber device to delete the unassociated root certificates. Alternatively, if deletion of the specified root certificates fails, the service provider entity may then command the subscriber device to disable them.

Upon the occurrence of a pre-determined event, such as the termination of a service contract between the service provider entity and the subscriber device, the service provider entity may send an additional command to the subscriber device to enable the specified root certificates that have previously disabled. Alternatively, if the specified root certificates were deleted, the additional command from the service provider entity is to replace the specified root certificates that have been previously deleted.

Another feature provides a service provider entity that personalizes a subscriber device. The service provider entity may include a processing circuit coupled to a memory device and a network communication interface for providing connectivity to the subscriber device. The service provider entity may establish a communication service or link with the subscriber device and mutual authentication between the subscriber device and the service provider entity may be accomplished. A command may then be sent to the subscriber device instructing the subscriber device to disqualify specified root certificates stored in the subscriber device; the specified root certificates are unassociated with the service provider entity.

Another feature provides a service provider device for personalizing a subscriber device, which service provider entity include means for establishing a communication service with a subscriber device. The subscriber device may further include means for sending a command to the subscriber device to disqualify specified root certificates stored on the subscriber device, the specified root certificates unassociated with the service provider entity.

Yet another feature provides a computer-readable medium that includes instructions for a service provider entity personalizing a subscriber device. When executed by a processor, the instructions may cause the processor to establish a communication service with a subscriber device; and send a command to the subscriber device to disqualify specified root certificates stored on the subscriber device, the specified root certificates unassociated with the service provider entity.

BRIEF DESCRIPTION OF THE DRAWINGS

Various features, natures and advantages may become apparent from the detailed description set forth below when taken in conjunction with the drawings in which like reference characters identify correspondingly throughout.

DETAILED DESCRIPTION

Figure 1:
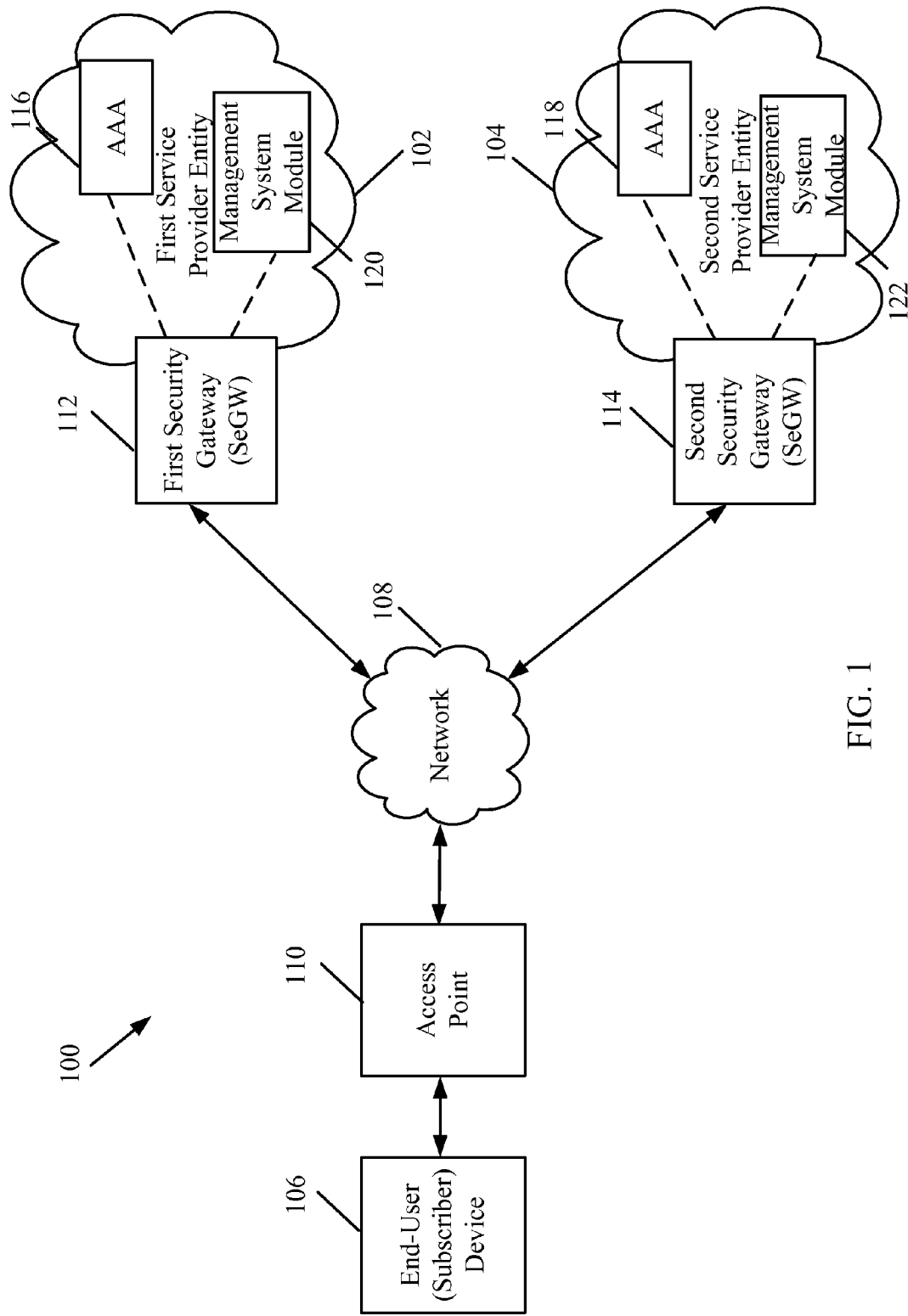
FIG. 1 illustrates a wireless network communication system in accordance with an aspect.

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation.

As used herein, an access point may be a fixed station used for communicating with an end-user device and may also be referred to as, and include some or all the functionality of, a base station, a Node B, or some other terminology. An end-user device may also be referred to as, and include some or all the functionality of, a user equipment (UE), a wireless or wired communication device, terminal, mobile terminal, a mobile station and/or any other suitable device for communicating over a network.

Overview

One feature provides a way to allow a subsidizing service provider entity (e.g., wireless service provider entity or carrier) to personalize a subscriber device to ensure the subscriber device cannot be used in a network of a different service provider entity. To ensure the subscriber device may operate only in its network and not in a network of a different service provider entity, the service provider entity may personalize the subscriber device by disqualifying all pre-configured root certificates on the subscriber device that are unassociated with the service provider entity.

According to one example, a method for personalizing a subscriber device is provided. The subscriber device may be pre-configured with a plurality of root certificates associated with a plurality of different service provider entities by the manufacturer of the subscriber device. Upon turning on the subscriber device or entering the network of the service provider entity, a communication service or link may be established between the service provider entity and the subscriber device. Once the communication service or link has been established, mutual authentication of the subscriber device and the service provider entity may be completed. After mutual authentication, the service provider entity may send a command (i.e. instructions) to the subscriber device to disqualify all root certificates that are unassociated with the service provider entity. By disqualifying all root certificates on the subscriber device that are not associated with the service provider entity that is subsidizing the subscriber device, the subscriber device may be unable to authenticate with a different service provider entity and thus will not be able to access services offered by other service provider entities which are not subsidizing the subscriber device.

In accordance with one aspect, the root certificates that are unassociated with the service provider entity may be disqualified by disabling the root certificates on the subscriber device. In other words, all root certificates, with the exception of the root certificate associated with the subsidizing service provider entity, may be disabled rendering them unusable until the service provider entity commands (or instructs) the subscriber device to enable the previously disabled root certificates. All disabled root certificates may remain on the subscriber device.

In accordance with another aspect, the root certificates that are unassociated with the service provider entity may be disqualified by deleting them from the subscriber device. In other words, all root certificates, with the exception of the root certificate associated with the subsidizing service provider entity, may be deleted from the subscriber device preventing the subscriber device from accessing a network of a different service provider entity.

After receiving the command from the service provider entity to disqualify all root certificates stored on the subscriber device that are unassociated with the service provider entity, the subscriber device may attempt to comply with the command by either disabling or deleting the unassociated root certificates, as instructed. Once the subscriber device has disabled or deleted the unassociated root certificates as instructed, or attempted to disable or delete the unassociated root certificates as instructed, the subscriber device may send an acknowledgement to the service provider entity. The acknowledgement may either indicate that the instructions to disqualify the unassociated root certificates were successful or that the disqualification of the unassociated root certificates failed. Upon receiving a failure acknowledgement from the subscriber device, the service provider entity may take additional steps to disqualify the unassociated root certificates. For example, if attempts to disable the unassociated root certificates failed, the service provider entity may then command the subscriber device to delete the unassociated root certificates. Alternatively, if attempts to delete the unassociated root certificates failed, the service provider entity may then command the subscriber device to disable the unassociated root certificates.

After all root certificates unassociated with the subsidizing service provider entity have been disqualified, a communication link may then be established between the service provider entity and the subscriber device providing the subscriber device access to higher-level services Once the high-level communication service or link has been established, the subscriber device may then have access to all functions and services available to the subscriber device. Furthermore, the subscriber device may be unable to authenticate with other service provider entities.

In yet another example, upon the occurrence of a pre-determined event, the service provider entity may optionally determine if the subscriber device may again have access to all the root certificates that were originally pre-configured onto the subscriber device, including all the root certificates that had been disqualified. The pre-determined event may be, for example, the end of a service contract between the subsidizing subscriber device and the service provider entity or upon payment of an unlocking or termination fee to the subsidizing service providing entity. Once the pre-determined event has occurred, the service provider entity may send a command to the subscriber device to enable root certificates previously disabled, or replace root certificates previously deleted. As a result, the subscriber device may then authenticate with another service provider entity. For instance, previously deleted root certificates may have been copied and/or stored by the service provider entity and may be sent to the subscriber device to be restored.

Exemplary Network Operating Environment

FIG. 1 illustrates a wireless network communication system 100 in accordance with an aspect. In this example, a first service provider entity 102 and a second service provider entity 104 are illustrated, where each service provider entity may provide subscriptions services to an end-user device 106. The end-user device 106 may be connected to a network 108, such as the Internet, via an access point 110 (e.g., femtocell, etc.). The end-user device 106 and access point 110 may be referred to as a "subscriber device". The access point 110 may access the first service provider entity 102 via a first security gateway 112 and/or the second service provider entity 104 via a second security gateway 114.

When the end-user device powers on or initially enters a network (e.g., within range of the access point 110), a communication service or link may be established with the service provider entity and an authentication/authorization/accounting (AAA) procedure may be undertaken prior to enabling the end-user device 106 to access services associated with the network. To that end, the end-user device 106 can provide identifying indicia to an access point, which can in turn relay such indicia to an AAA or authentication server.

The established communication service or link may allow for low-level communications between the service provider entity and the subscriber device. Low-level communications may be non-user controlled services restricted to communications, for example, occurring below the application layer in a typical protocol stack including, but not limited to the non-access stratum (NAS) layer, radio resource control (RRC) layer, radio link control (RLC) layer, media access control (MAC) layer and the physical (PHY) layer.

As shown in FIG. 1, each service provider entity 102, 104 may include an authentication, authorization and accounting (AAA) server 116 and 118, respectively. The AAA servers 116, 118 may serve to authenticate connections and keep track of the accounting for billing, etc. by the carrier or service provider entity. Authentication may occur by utilizing public-key cryptography so that messages and transactions may be mutually authenticated. In one aspect, a Rivest, Shamir and Adleman (RSA) encryption algorithm may be utilized. In one aspect, a Secure Hash Algorithm (SHA-1) hash algorithm may be utilized for the signature.

By mutually authenticating transactions, fraud may be avoided as there may be secure/signed confirmation that the end-user device is authentic as well as secure confirmation that the server is authentic. In public key-private key cryptography, asymmetric key algorithms are used, i.e. the key used to encrypt a message is not the same as the key used to decrypt it. Each user has a pair of cryptographic keys—a public key and a private key. The private key is kept secret, while the public key may be widely distributed. Messages are encrypted with the recipient's public key and can only be decrypted with the corresponding private key. The keys are related mathematically, but the private key cannot be feasibly (i.e., in actual or projected practice) derived from the public key. Furthermore, transactions using key information may be unique to the end-user device or remote wireless device. Each end-user device may include a unique device serial number which may be the mobile equipment identifier (MEID) or the international mobile equipment identity/identification (IMEI) or a device specific hardware address such as the Institute of Electrical and Electronics Engineers (IEEE) Hardware Address. The device certificate is identified using the unique device identifier associated with the subscriber device. By utilizing unique identification for each subscriber device, the flow of activations versus shipments may be tracked and double-counting may be avoided.

Each service provider entity may also include a management system module or management server 120, 122 for configuring and monitoring the operation of subscriber devices (e.g., end-user devices or femtocells) as well as issuing commands to the end-user devices. Once the subscriber device has been authenticated with the first service provider entity 102, it may not then access the network of the second service provider entity 104 and vice versa. This may be as a result of disqualifying (i.e. disabling or deleting) root certificates for other service provider entities, so that the subscriber devices cannot operate with other services provider entities (e.g., because the subscriber devices lack the root certificate to authenticate the other service provider entities).

Exemplary Communication System

As an end-user device and access point, as described above, can be employed in conjunction with various features and/or aspects described herein, both may be collectively referred to as a subscriber device. The subscriber device may be pre-configured with a plurality of root certificates that are associated with different service provider entities. A service provider entity may personalize the subscriber device to ensure the subscriber device may be used with that specific service provider entity and cannot be used in a network of a different service provider entity. That is, the service provider entity may have subsidized the sale or deployment of the subscriber device to one or more users; consequently it may wish to restrict its use so that the subscriber device cannot be used with other service provider entities (i.e., other communication carriers) for a period of time.

A subscriber device may be placed in use or activated by a service provider entity or communication carrier. That is, after a subscriber device is sold or deployed to a user, communication service with a service provider entity (e.g., communication carrier) may be activated for the subscriber device. The communication carrier may also restrict one or more root keys or certificates have subsidized the sale or deployment of the subscriber device to one or more users, consequently it may wish to restrict use of the subscriber so that it does not operate with any other service provider entity (i.e., other communication carriers).

Figure 8:
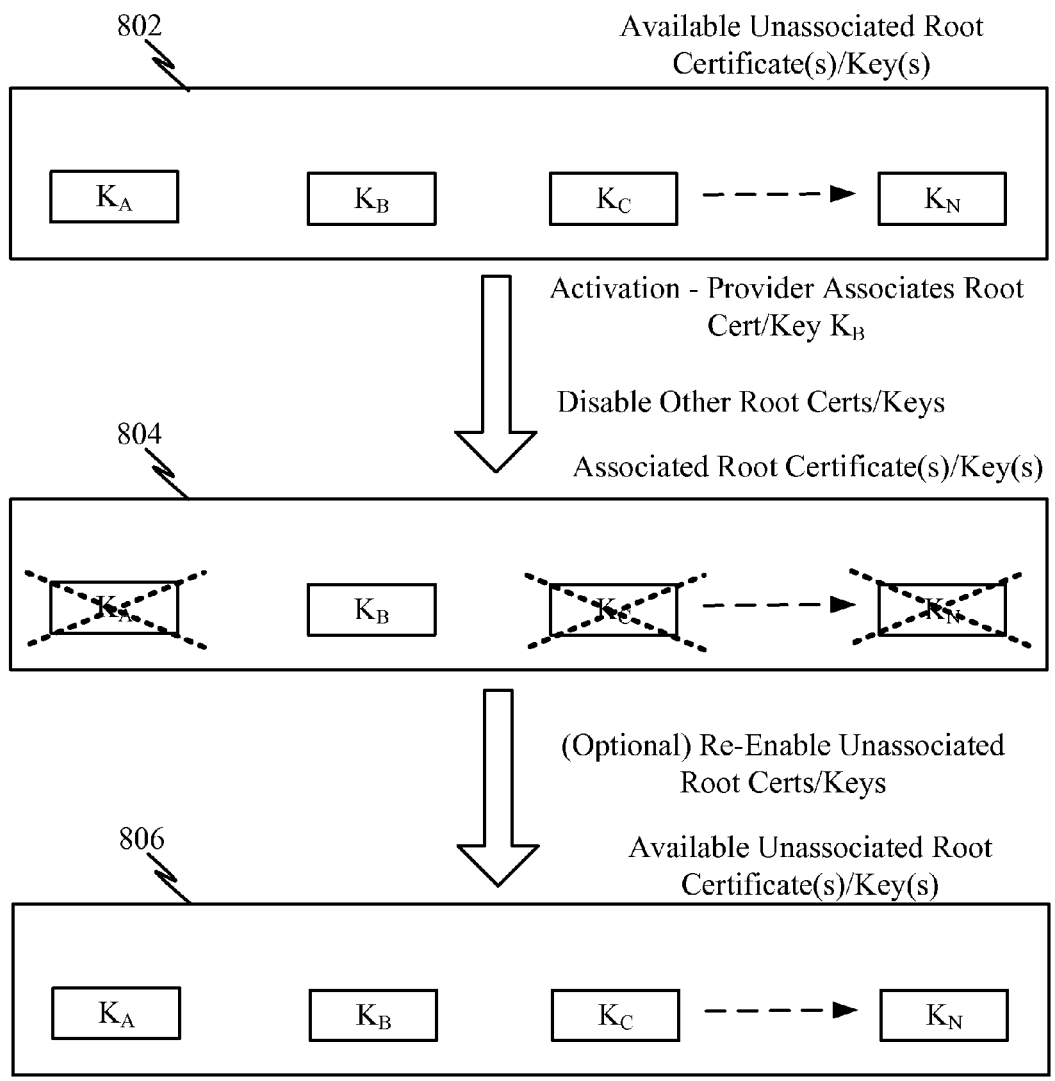
FIG. 8 illustrates how a set of unassociated root certificates may be provisioned in a subscriber device and disabled by a service provider entity.

FIG. 8 illustrates how a set of unassociated root certificates may be provisioned in a subscriber device and disabled by a service provider entity. In this example, a set of unassociated root certificates/keys 802, including root certificates/keys $K_A$, $K_B$, $K_C$, ... $K_N$, may be provisioned in the subscriber device. As provisioned, the unassociated certificates/keys 802 are available for use by any provider (i.e., the unassociated are not initially provider-specific). As part activation, where the subscriber device is setup with communication service from a service provider entity (i.e., communication carrier), the provider may select a first unassociated root certificate/key $K_B$ which may be used to setup and/or establish service and other keys. After the provider has selected the first unassociated root certificate/key $K_B$, it may send a command to cause the subscriber device to disable/delete some or all of the other root certificates/keys $K_A$, $K_C$, ... $K_N$ 804. By disabling/deleting some or all other root certificates/keys $K_A$, $K_C$, ... $K_N$, the service provider entity effectively prevents the subscriber device from being activated by other providers. At some point (e.g., once a subscriber contract has lapsed), the service provider entity may re-enable the unassociated root certificates/keys 806 that were previously disabled/deleted. This allows other providers to now provide service to the subscriber device.

Figure 9:
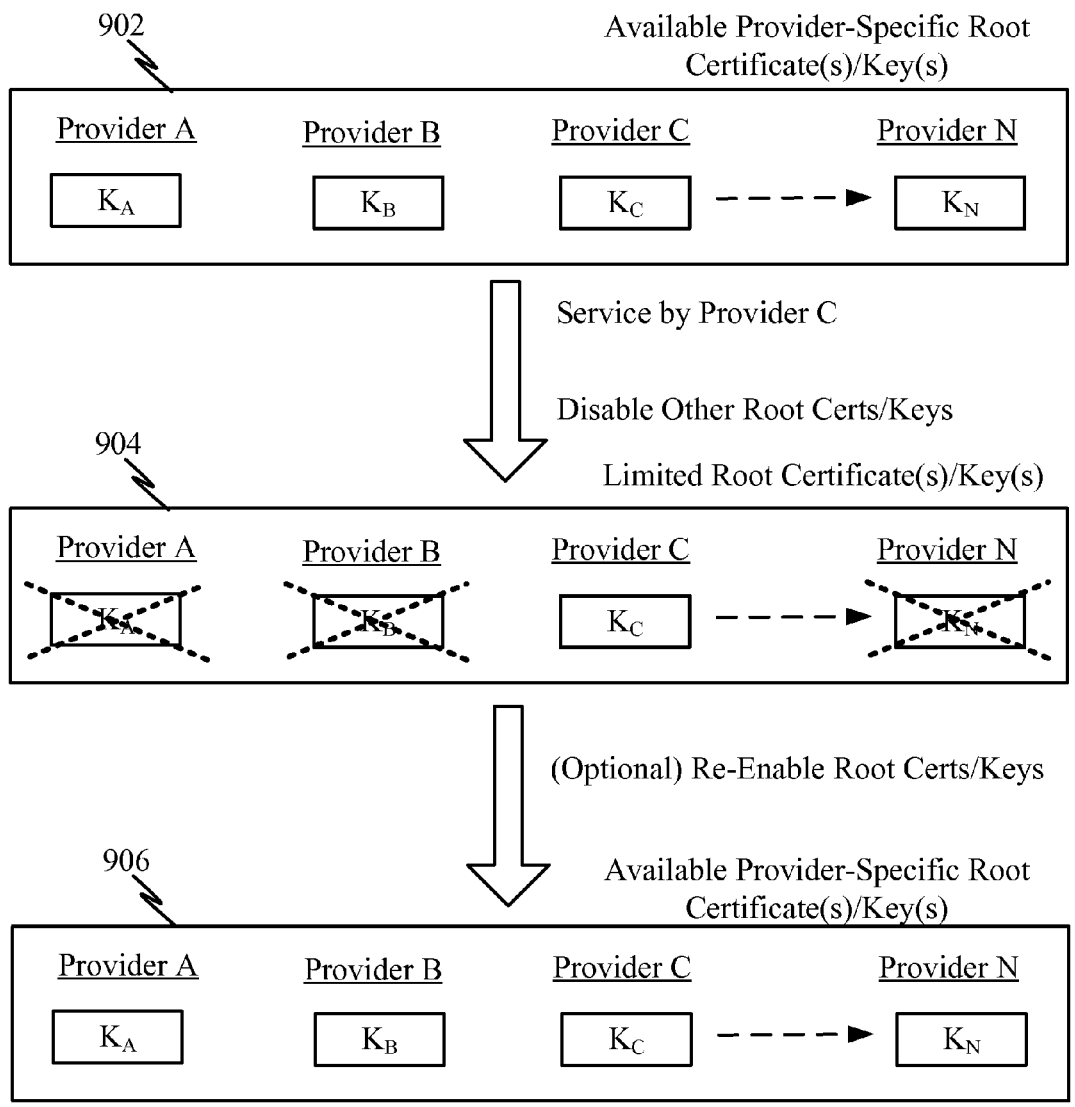
FIG. 9 illustrates how a set of provider-specific root certificates may be provisioned in a subscriber device and disabled by a service provider entity.

FIG. 9 illustrates how a set of provider-specific root certificates may be provisioned in a subscriber device and disabled by a service provider entity. In this example, a set of provider-specific root certificates/keys 902, including root certificates/keys $K_A$, $K_B$, $K_C$, ... $K_N$, may be provisioned in the subscriber device. As provisioned, each provider-specific certificate/key is available for use by a corresponding provider (i.e., each provider has an associated certificate/key). As part activation, where the subscriber device is setup with communication service from a service provider entity (i.e., communication carrier), a provider C may select its root certificate/key $K_C$ which may be used to setup and/or establish service and other keys. After the provider C has selected the provider-specific root certificate/key $K_C$, it may send a command to cause the subscriber device to disable/delete some or all of the other root certificates/keys $K_A$, $K_C$, ... $K_N$ 904. By disabling/deleting some or all other root certificates/keys $K_A$, $K_C$, ... $K_N$, the service provider entity (provider C) effectively prevents the subscriber device from being activated by other providers (i.e., providers A, B, and N). At some point (e.g., once a subscriber contract has lapsed), the service provider entity may re-enable the other provider-specific root certificates/keys 906 that were previously disabled/deleted. This allows other providers to now provide service to the subscriber device.

Figure 10:
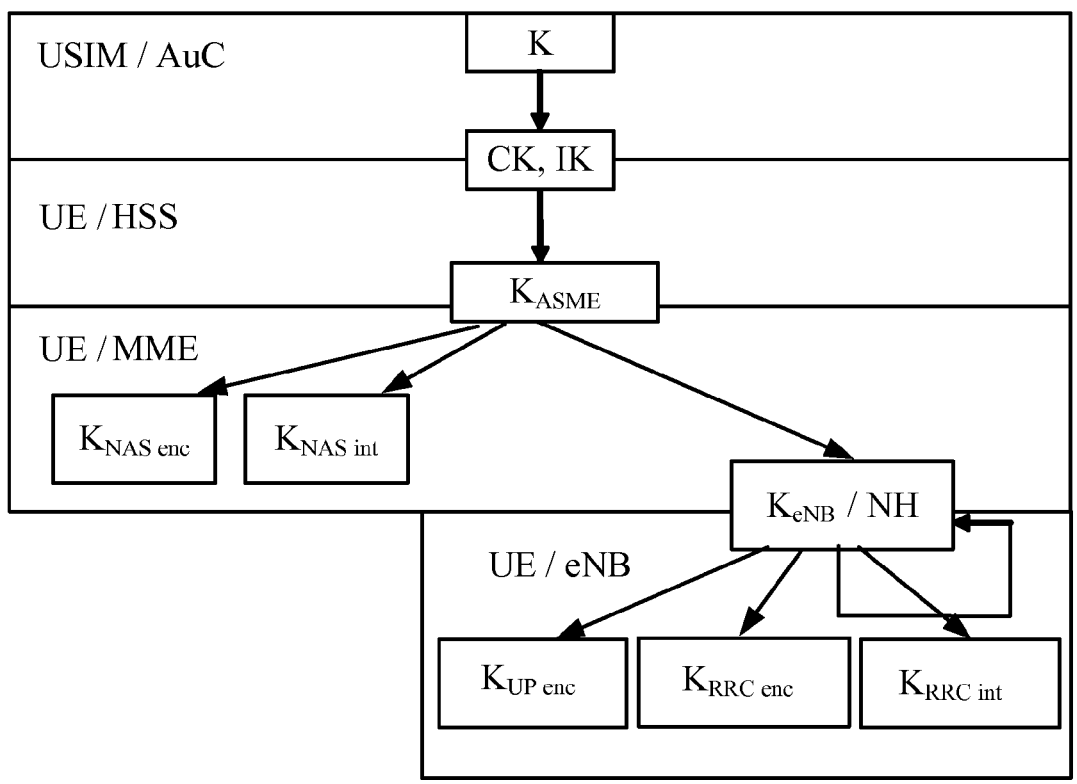
FIG. 10 illustrates an example of a root certificate/key hierarchy.

An example of a root certificate/key is illustrated and described in FIG. 10.

Disable Unassociated Root Certificates

Figure 2:
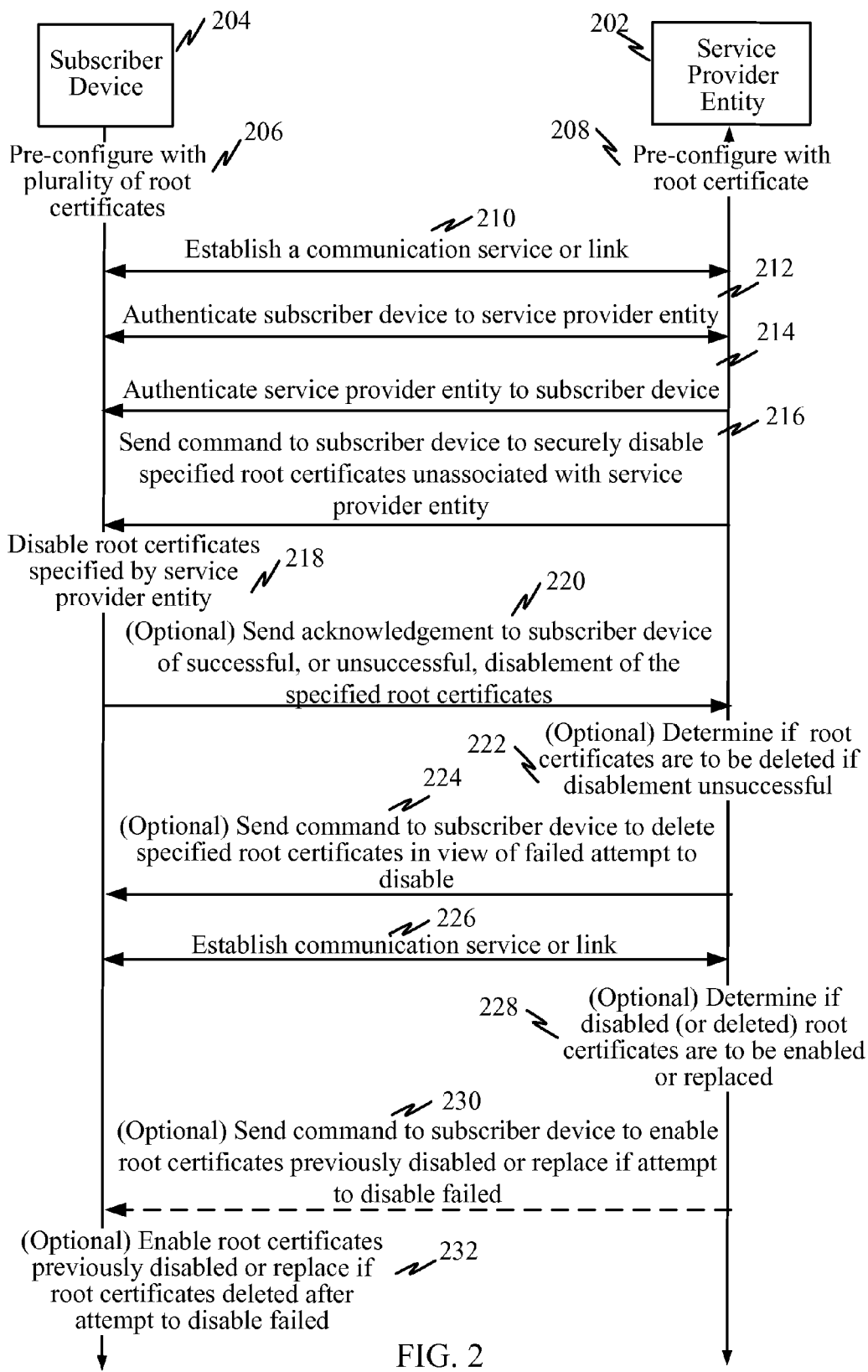
FIG. 2 is a flow diagram illustrating the operation of a communication system in which a service provider entity personalizes a subscriber device to ensure the subscriber device cannot be used in a network of a different service provider entity by commanding the subscriber device to disable all root certificates unassociated with the service provider entity.

FIG. 2 is a flow diagram illustrating the operation of a communication system in which a service provider entity 202 personalizes a subscriber device 204 to ensure the subscriber device cannot be used in a network of a different service provider entity by commanding the subscriber device to disable all root certificates unassociated with the service provider entity.

The subscriber device 204 may be pre-configured with a plurality of root certificates (i.e. trusted Certificate Authority certificates) for a plurality of different service provider entities 206 for authenticating with one of the plurality of service provider entities. In other words, a manufacturer of subscriber devices may install a plurality of root certificates onto all of its subscriber devices so that the subscriber devices may be used with various different service provider entities. The service provider entity may also be pre-configured with root certificates for authenticating the subscriber devices 208.

When the subscriber device 204 powers on, or initially enters a network, a communication link may be established between the subscriber device and the service provider entity 210. This communication service or link may allow the subscriber device to have access to low-level services, which as described above, may be restricted to communications occurring below the application layer in a typical protocol stack. After the communication link has been established, an authentication/authorization/accounting (AAA) procedure may be undertaken prior to enabling the subscriber device 204 to access higher-level services, such as communications occurring in the application layer of a typical protocol stack. Using methods well known in the art, the subscriber device may be authenticated to the service provider entity 212 and the service provider entity may be authenticated to the subscriber device 214. After the mutual authentication of the subscriber device and the service provider entity, the service provider entity may send a command (or instructions) to the subscriber device to securely disqualify specified root certificates pre-configured on the subscriber device by disabling them 216.

In one example, the specified root certificates may be root certificates for authentication with different service provider entities. That is, the root certificates to be disabled are unassociated with the service provider entity in which the subscriber device has been mutually authenticated with. Consequently, by disabling the root certificates for other service provider entities, the subscriber device 204 is unable to authenticate with those other service provider entities and thus cannot be used in the networks of the other service provider entities. In other words, all root certificates pre-configured on the subscriber device may remain on the subscriber device but are disabled so that the subscriber device cannot authenticate with a different service provider entity.

Upon receiving the command, the subscriber device 204 may then disable the root certificates specified by the service provider entity 218. The specified root certificates may include all root certificates stored on the subscriber device that are unassociated with the service provider entity. Note that existing end-user device management protocols, such as Open Mobile Alliance-Device Management (OMA-DM) or Technical Report 069 (TR-069), may support suitable commands as well as appropriate security in order to perform such management operations in a secure and a trusted manner.

Once the subscriber device has disabled the unassociated root certificates as instructed, or attempted to disable the unassociated root certificates, the subscriber device may send an acknowledgement to the service provider entity 220. The acknowledgement may either indicate that the instructions to disqualify (i.e. disable) the unassociated root certificates were successful or that the disablement of the unassociated root certificates has failed. Upon receiving a failure acknowledgement from the subscriber device, the service provider entity may take additional steps to disqualify the unassociated root certificates on the subscriber device. For example, if attempts to disable the unassociated root certificates failed, the service provider entity may then decide to command the subscriber device to delete the unassociated root certificates instead of disabling the specified root certificates 222. A new command may be sent to the subscriber device from the service provider entity instructing the subscriber device to delete all root certificates unassociated with the service provider entity 224.

Once the specified unassociated root certificates have been disqualified, by disablement or deletion, a communication service or link may be established between the subscriber device and the service provider entity allowing the subscriber device access to higher-level services 226. In one example, upon the occurrence of a pre-determined event, the service provider entity may optionally determine if the root certificates that the subscriber device disabled (or deleted if disablement failed) may be enabled (or replaced) on the subscriber device 228. The pre-determined event may be, for example, the end of a service contract between the subscriber device and the service provider entity or upon payment of an unlocking or early termination fee. If the service provider entity determines that the disabled (or deleted) root certificates are to be enabled (or replaced), the service provider entity may securely send a command (or instructions) to the subscriber device to enable (or replace) the root certificates that had been previously disabled (or deleted) 230. Upon receiving the command, the disabled (or deleted) root certificates may be enabled (or replaced) on the subscriber device 232. As a result, the subscriber device may then have the ability to establish communication service with another service provider entity.

Delete Unassociated Root Certificates

Figure 3:
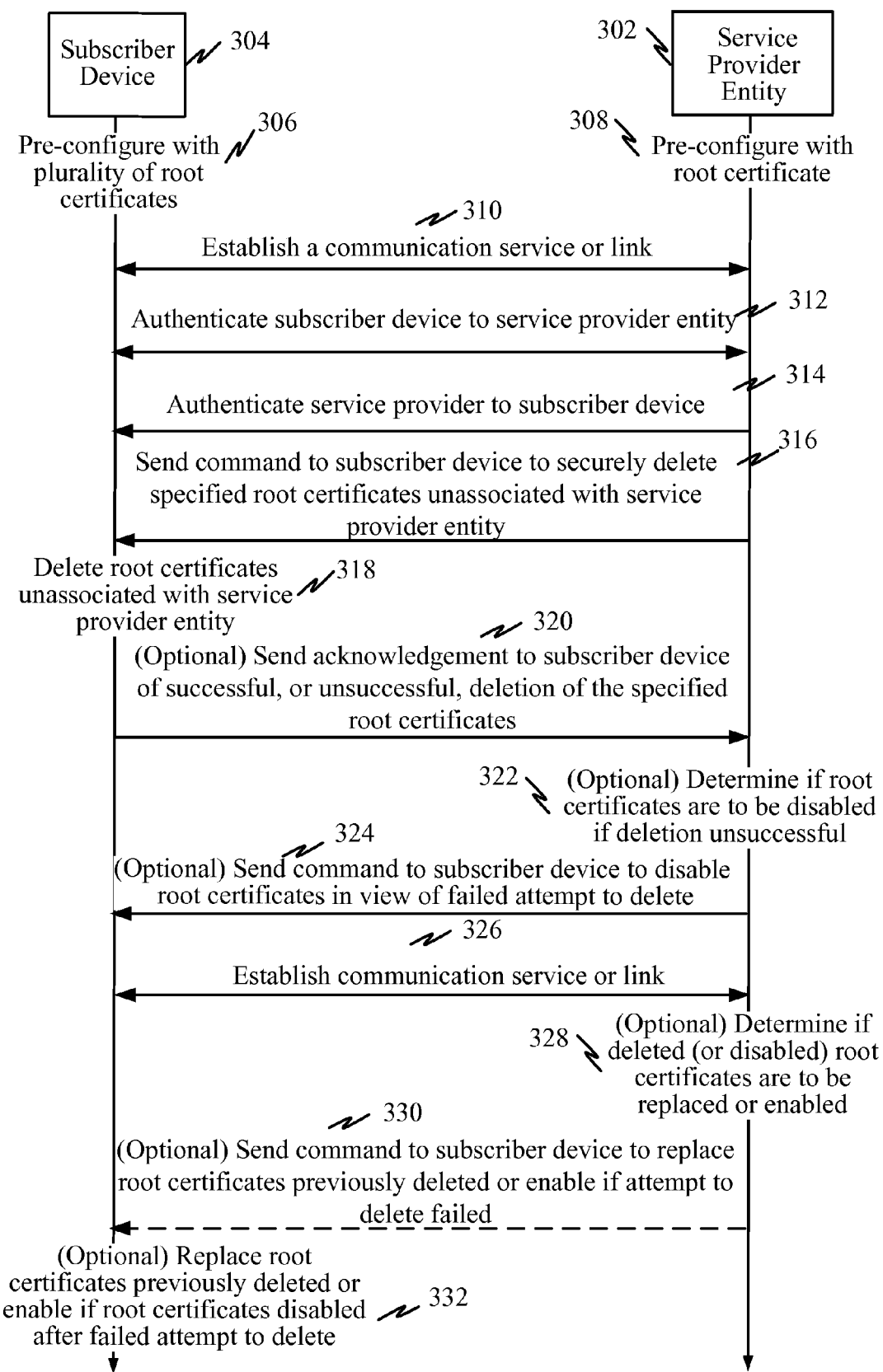
FIG. 3 is a flow diagram illustrating the operation of a communication system in which a service provider entity personalizes a subscriber device to ensure the subscriber device cannot be used in a network of a different service provider entity by commanding the subscriber device to delete all root certificates unassociated with the service provider entity.

FIG. 3 is a flow diagram illustrating the operation of a communication system in which a service provider entity 302 personalizes a subscriber device 304 to ensure the subscriber device cannot be used in a network of a different service provider entity by commanding the subscriber device to delete all root certificates unassociated with the service provider entity.

The subscriber device 304 may be pre-configured with a plurality of root certificates (i.e. trusted Certificate Authority certificates) for a plurality of different service provider entities 306 for authenticating with one of the plurality of service provider entities. The service provider entity may also be pre-configured with root certificates for authenticating subscriber devices 308.

When the subscriber device 304 powers on, or initially enters a network, a communication link may be established between the subscriber device and the service provider entity 310. Similar to FIG. 2, as described above, this communication service or link may allow the subscriber device access to low-level services, which as described above, may include communications restricted to communications occurring below the application layer in a typical protocol stack. After the communication link has been established, an authentication/authorization/accounting (AAA) procedure may be undertaken prior to enabling the subscriber device 304 to access high-level, such as communications occurring in the application layer of a typical protocol stack. Using methods well known in the art, the subscriber device may be authenticated to the service provider entity 312 and the service provider entity may be authenticated to the subscriber device 314. After the mutual authentication of the subscriber device and the service provider entity, the service provider entity may send a command (or instructions) to the subscriber device to securely disqualify specified root certificates pre-configured on the subscriber device by deleting them 316.

In one example, the specified root certificates may be root certificates for authentication with different service provider entities. That is, the root certificates to be deleted are unassociated with the service provider entity in which the subscriber device has been mutually authenticated with. Consequently, by deleting the root certificates for other service provider entities, the subscriber device 304 is unable to authenticate with other service provider entities and thus cannot be used in the networks of the other service provider entities. Upon receiving the command, the subscriber device 304 may then delete the root certificates specified by the service provider entity 318. The specified root certificates may include all root certificates stored on the subscriber device that are unassociated with the service provider entity. Note that existing end-user device management protocols, such as Open Mobile Alliance-Device Management (OMA-DM) or Technical Report 069 (TR-069), may support suitable commands as well as appropriate security in order to perform such management operations in a secure and a trusted manner.

Once the subscriber device has deleted the unassociated root certificates as instructed, or attempted to delete the unassociated root certificates, the subscriber device may send an acknowledgement to the service provider entity 320. The acknowledgement may either indicate that the instructions to disqualify (i.e. delete) the unassociated root certificates were successful or that the deletion of the unassociated root certificates has failed. Upon receiving a failure acknowledgement from the subscriber device, the service provider entity may take additional steps to disqualify the unassociated root certificates. For example, if attempts to delete the unassociated root certificates failed, the service provider entity may then decide to command the subscriber device to disable the unassociated root certificates 322. A new command may be sent to the subscriber device from the service provider entity instructing the subscriber device to disable all root certificates unassociated with the service provider entity 324.

Once the unassociated root certificates have been disqualified, by deletion or disablement, a communication service or link may be established between the subscriber device and the service provider entity allowing the subscriber device access to higher-level services 326. In one example, upon the occurrence of a pre-determined event, the service provider entity may optionally determine if the root certificates that the subscriber device deleted (or disabled if deletion failed) may be replaced (or enabled) on the subscriber device 328. The pre-determined event may be, for example, the end of a service contract between the subscriber device and the service provider entity or upon payment of an unlocking or early termination fee. If the service provider entity determines that the deleted (or disabled) root certificates are to be replaced (or enabled), the service provider entity may securely send a command (or instructions) to the subscriber device to replace (or enable) the root certificates that had been previously deleted (or disabled) 330. Upon receiving the command, the deleted (or disabled) root certificates may be replaced (or enabled) on the subscriber device 332. As a result, the subscriber device may then have the ability to establish communication service with another service provider entity.

Note that the methods, apparatuses and systems described herein may be applicable to any device which connects to an operator network or service provider entity using certificate-based mutual authentication. Examples may include relays (such as the Long Term Evolution (LTE) Relays being specified by 3GPP) as well as Mobile-to-Mobile (M2M) devices and future generic User Equipment/Mobile Equipment (UE/ME) that support certificate based mutual authentication. Secure storage and execution environment (such as the Secure Environment or Trusted Environment) for the root certificates may be desired to prevent the subscription device from being susceptible to attacks such as making a copy of all the manufacturer-installed certificates before connecting the subscription device, then reinstalling them. For example, standards-compliant femtocells already define this secure storage and execution environments as part of a trusted or secure environment (see 3GPP TS 33.320 or 3GPP2 S.S0132).

Exemplary Subscriber Device

Figure 4:
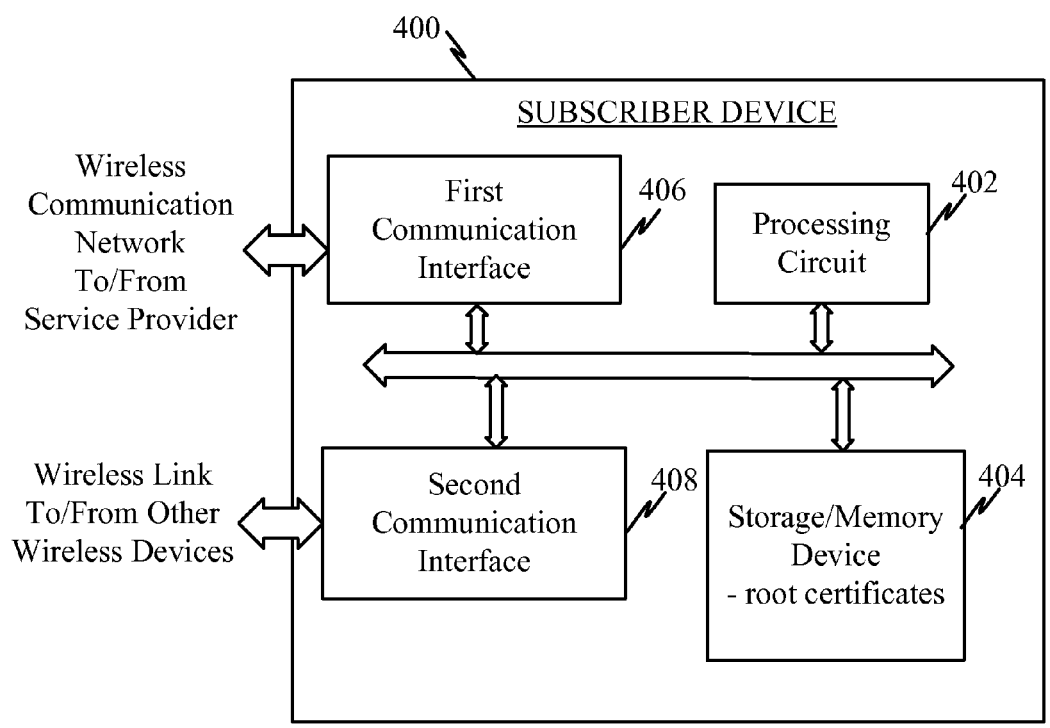
FIG. 4 illustrates a block diagram of an internal structure of a subscriber device according to one example.
Figure 5A:
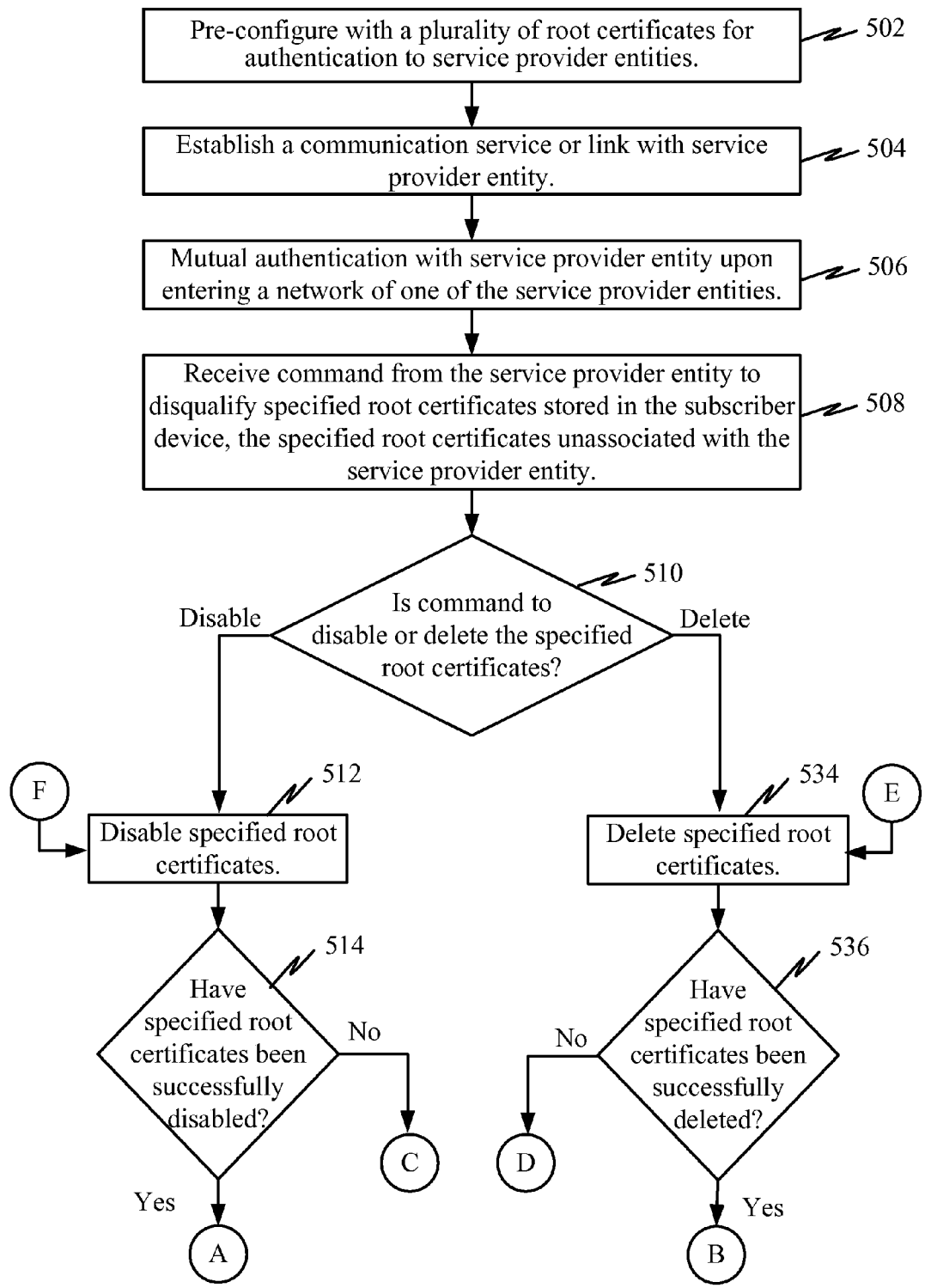
FIG. 5 (comprising FIGS. 5A, 5B, 5C and 5D) illustrates an example of the operation of the subscriber device.
Figure 5B:
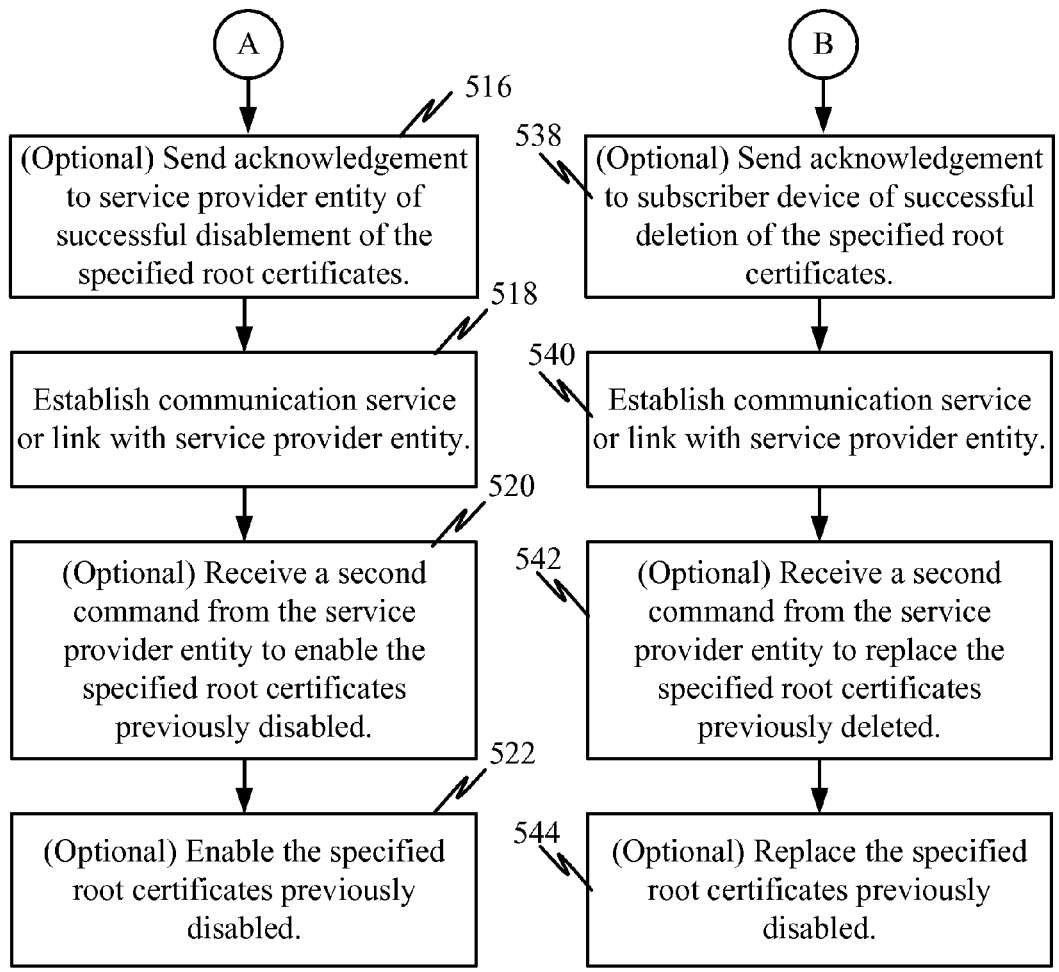
Figure 5C:
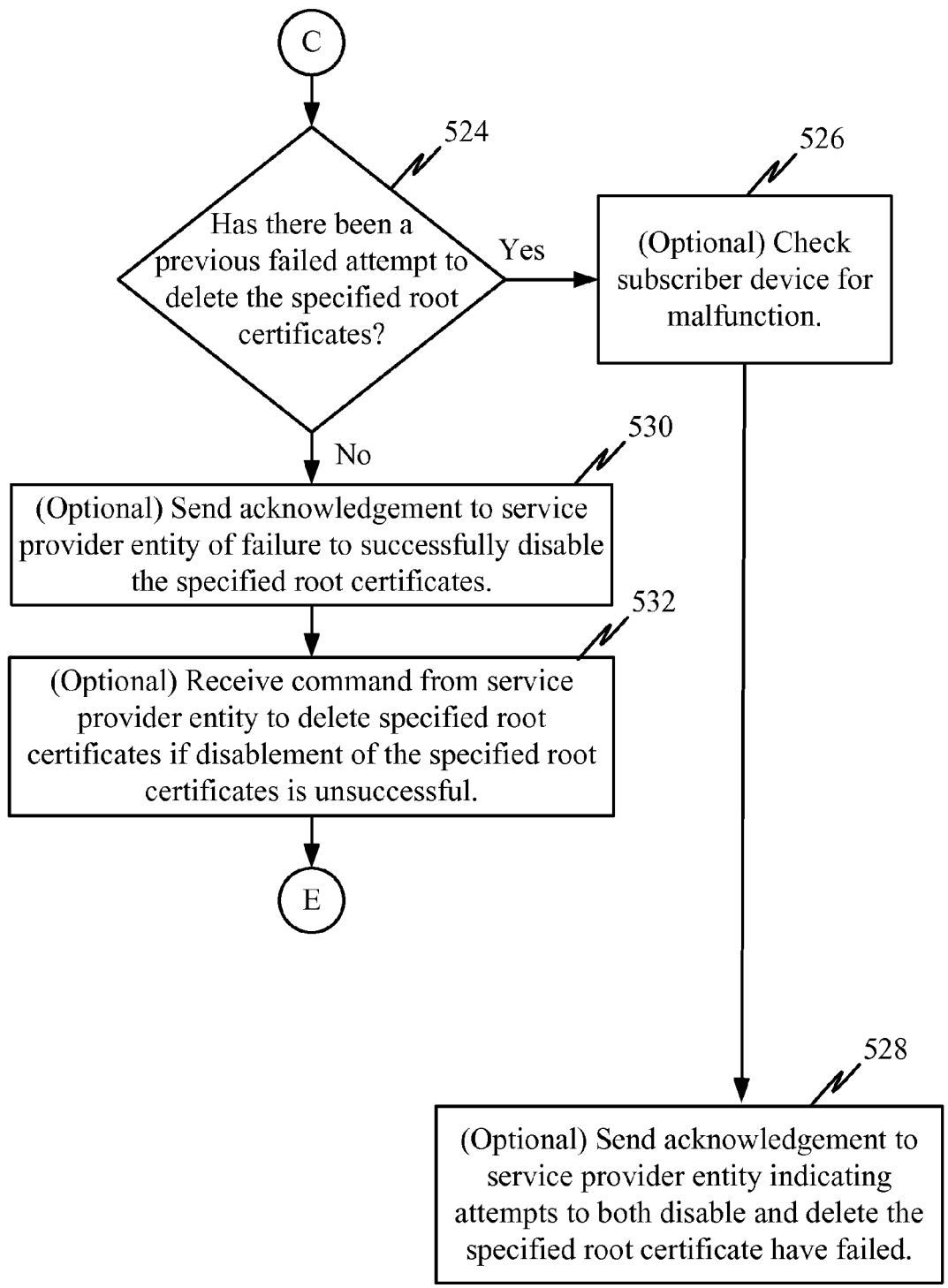
Figure 5D:
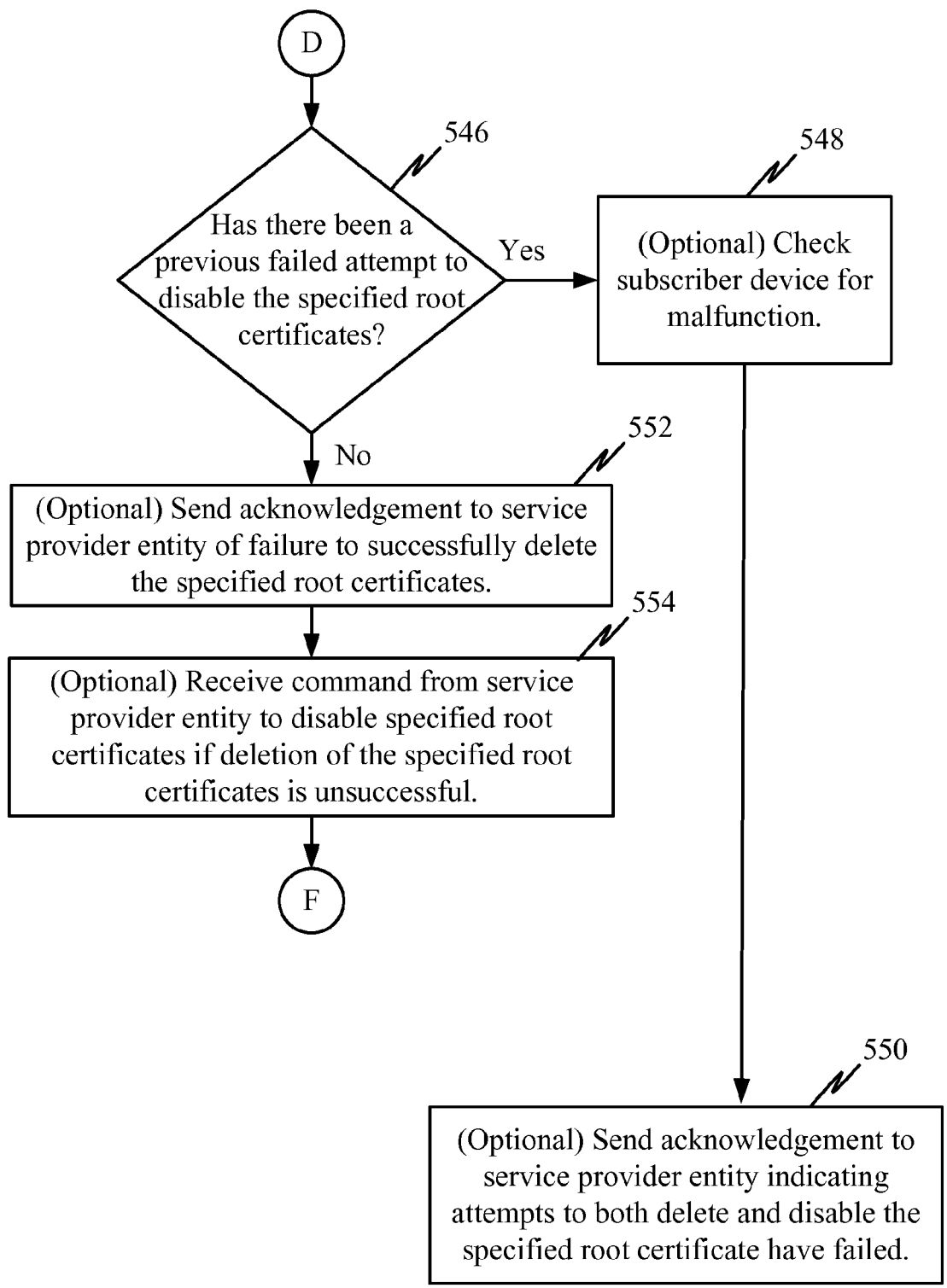

FIG. 4 illustrates a block diagram of an internal structure of a subscriber device 400 according to one example. The subscriber device 400 may include a processing circuit (e.g., processor, processing module, etc) 402 for executing computer-executable process steps and a memory device 404 to store root certificates. The subscriber device 400 may also include a first communication interface 406 for communicatively coupling the subscriber device 400 to a wireless communication network operated by a service provider. This first communication interface 406 serves to establish a link between the subscriber device 400 and the service provider.

In some implementations, such as when the subscriber device 400 is a femtocell or Node B, the subscriber device 400 may also include a second communication interface 408 for connecting the subscriber device 400 to other subscriber devices. In such configuration of the subscriber device 400 may relay communications to/from other wireless devices via the second communication interface 408.

Exemplary Operation of Subscriber Device

FIG. 5 (comprising FIGS. 5A, 5B, 5C and 5D) illustrates an example of the operation of the subscriber device. The subscriber device may be provisioned (or pre-configured) with a plurality of root certificates (i.e. trusted CA certificates) for a plurality of service provider entities for mutually authenticating the service provider entity to one of the plurality of service provider entities 502. Next, upon entering the network of one of the plurality of service provider entities, or powering on the subscriber device in the network of one of the plurality of service provider entities, a communication link may be established between the subscriber device and the service provider entity 504. This communication service or link may allow the subscriber device access to low-level services, which as described above, may be restricted to communications occurring below the application layer in a typical protocol stack.

After the communication link has been established, using methods well known in the art, the subscriber device may be mutually authenticated with the service provider entity in which network it entered 506. Once mutual authentication has occurred between the subscriber device and the service provider entity, the subscriber device may receive a command (or instructions) from the service provider entity to securely disqualify specified root certificates stored (i.e. pre-configured) on the subscriber device that are unassociated with the service provider entity 508. Upon receiving the command from the service provider entity to disqualify the specified unassociated root certificates, the subscriber device may determine if the command is to disable or delete the specified unassociated root certificates 510.

Disable Specified Root Certificates

If the command is to disqualify the specified unassociated root certificates by disabling them, the subscriber device may then attempt to disable the specified root certificates 512. Next, the subscriber device determines if the specified root certificates were successfully disabled 514. If the specified root certificates were successfully disabled, the subscriber device may optionally send an acknowledgement to the service provider entity indicating the successful disablement of the specified root certificates 516. A communication service or link may then be established with the service provider entity 518 allowing the subscriber device access to higher-level services.

Optionally, the subscriber device may receive a second command from the service provider entity to enable the specified root certificates that have been previously disabled 520. In one example, the second command may be received upon the occurrence of a pre-determined event. The pre-determined event may be, for example, the end of a service contract between the subscriber device and the service provider entity or the payment of an unlocking or early termination fee to the service provider entity. Upon receiving the command, the specified root certificates that were previously disabled may now be enabled on the subscriber device 522. As a result, the subscriber device may then establish communication service with another service provider entity.

Alternatively, if it is determined that the specified root certificates were unsuccessfully disabled 514, the subscriber device may determine if there has been a previous failed attempt to delete the specified root certificates 524. If there has been a previous failed attempt to delete the specified root certificates, this in combination with the failed attempt to disable the specified root certificates, may indicate that there may be a malfunction of the subscriber device 526 and the subscriber device may need to be fixed or replaced. An acknowledgement may then be sent to the service provider entity indicating attempts to both disable and delete the specified root certificates have failed and there may be a malfunction with the subscriber device 528.

Conversely, if there has not been a failed attempt to delete the specified root certificates 524, an acknowledgement may be sent to the service provider entity indicating a failure to successfully disable the specified root certificates 530. Optionally, the subscriber device may then receive a command from the service provider entity, in response to the failure acknowledgement, to delete the specified root certificates 532. The subscriber device may then try to delete the specified root certificates 534.

Deletion of Specified Root Certificates

If the command from the service provider entity to disqualify the specified unassociated root certificates is to delete the specified unassociated root certificates 510, the subscriber device may then attempt to delete the specified root certificates 534. Next, the subscriber device may determine if the specified root certificates were successfully deleted 536. If the specified root certificates were successfully deleted, the subscriber device may send an acknowledgement to the service provider entity indicating the successful deletion of the specified root certificates 538. A communication service or link may then be established with the service provider entity 540 allowing the subscriber device access to higher-level services.

Optionally, the subscriber device may receive a second command from the service provider entity to replace the specified root certificates that have been previously deleted 542. In one example, the second command may be received upon the occurrence of a pre-determined event. The pre-determined event may be, for example, the end of a service contract between the subscriber device and the service provider entity or the payment of an unlocking or early termination fee to the service provider entity. Upon receiving the second command, the specified root certificates that were previously deleted may now be replaced on the subscriber device 544. As a result, the subscriber device may then establish communication service with another service provider entity.

Alternatively, if it is determined that the specified root certificates were unsuccessfully deleted 536, the subscriber device may determine if there has been a previous failed attempt to disable the specified root certificates 546. If there has been a previous failed attempt to disable the specified root certificates, this in combination with the failed attempt to delete the specified root certificates may indicate that there may be a malfunction of the subscriber device 548 and the subscriber device may need to be fixed or replaced. An acknowledgement may then be sent to the service provider entity indicating attempts to both delete and disable the specified root certificates have failed and there may be a malfunction with the subscriber device 550.

Conversely, if there has not been a previous failed attempt to disable the specified root certificates 546, an acknowledgement may be sent to the service provider entity indicating a failure to successfully delete the specified root certificates 552. Optionally, the subscriber device may then receive a command from the service provider entity, in response to the failure acknowledgement, to disable the specified root certificates 554. The subscriber device may then try to disable the specified root certificates 512.

Exemplary Service Provider Entity

Figure 6:
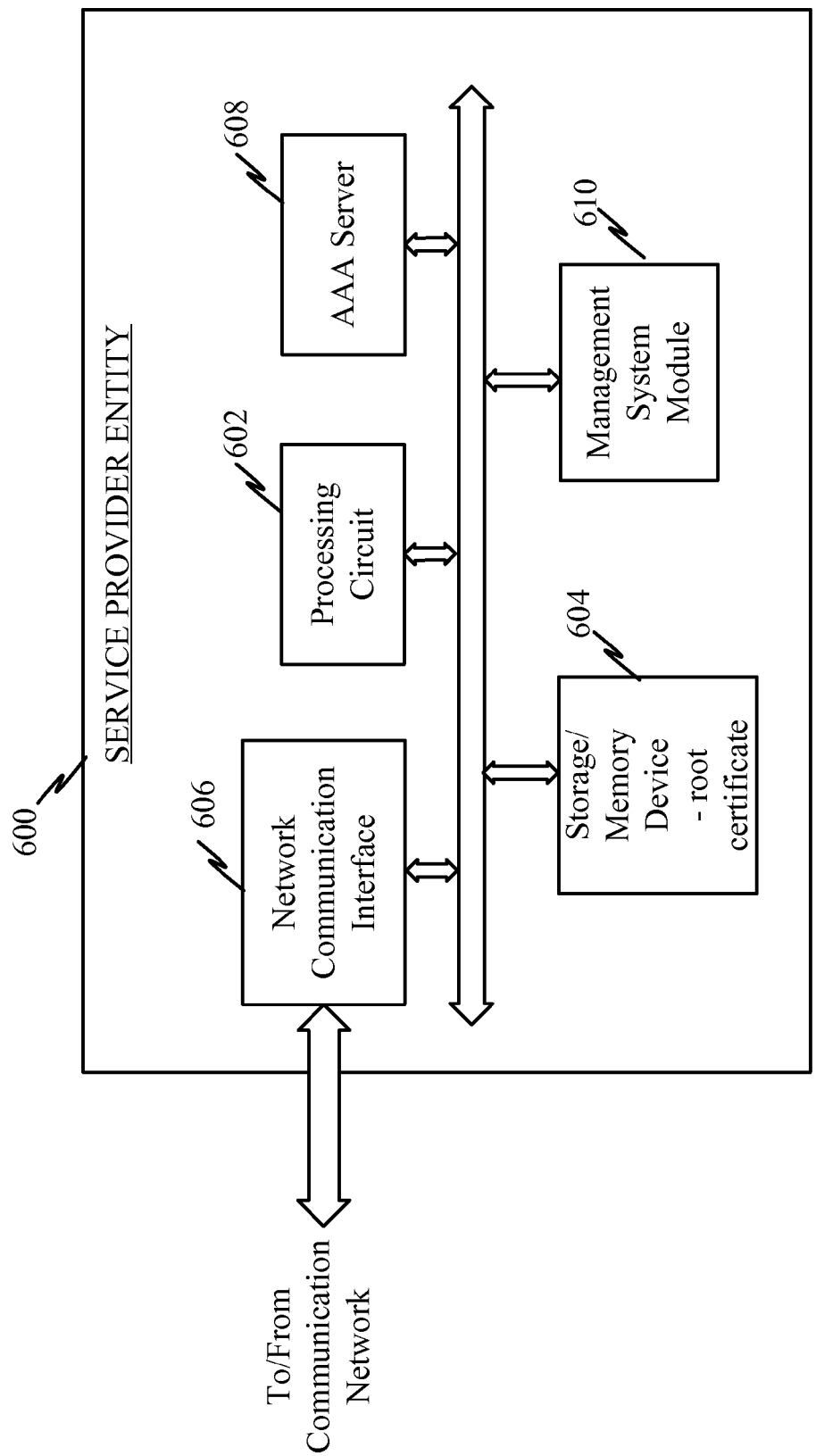
FIG. 6 illustrates a block diagram of an internal structure of a service provider entity according to one example.

FIG. 6 illustrates a block diagram of an internal structure of a service provider entity 600 according to one example. As described above, the service provider entity 600 may provide communication or subscription services to a subscriber device.

The service provider entity 600 may include a processing circuit (e.g., processor, processing module, etc) 602 for executing computer-executable process steps and a memory device 604 to store root certificates. The service provider entity 600 may also include a network communication interface 606 for communicatively coupling the service provider entity 600 to a subscriber device.

The service provider entity 600 may also include an include an authentication, authorization and accounting (AAA) server 608 for performing an AAA procedure which, as described above, may be undertaken prior to enabling the subscriber device to access high-level services associated with the service provider entity.

In one aspect, the service provider entity 600 may also include a management system module 610 for configuring and monitoring the operation of subscriber devices as well as issuing commands to the subscriber devices.

Exemplary Operation of Service Provider Entity

Figure 7A:
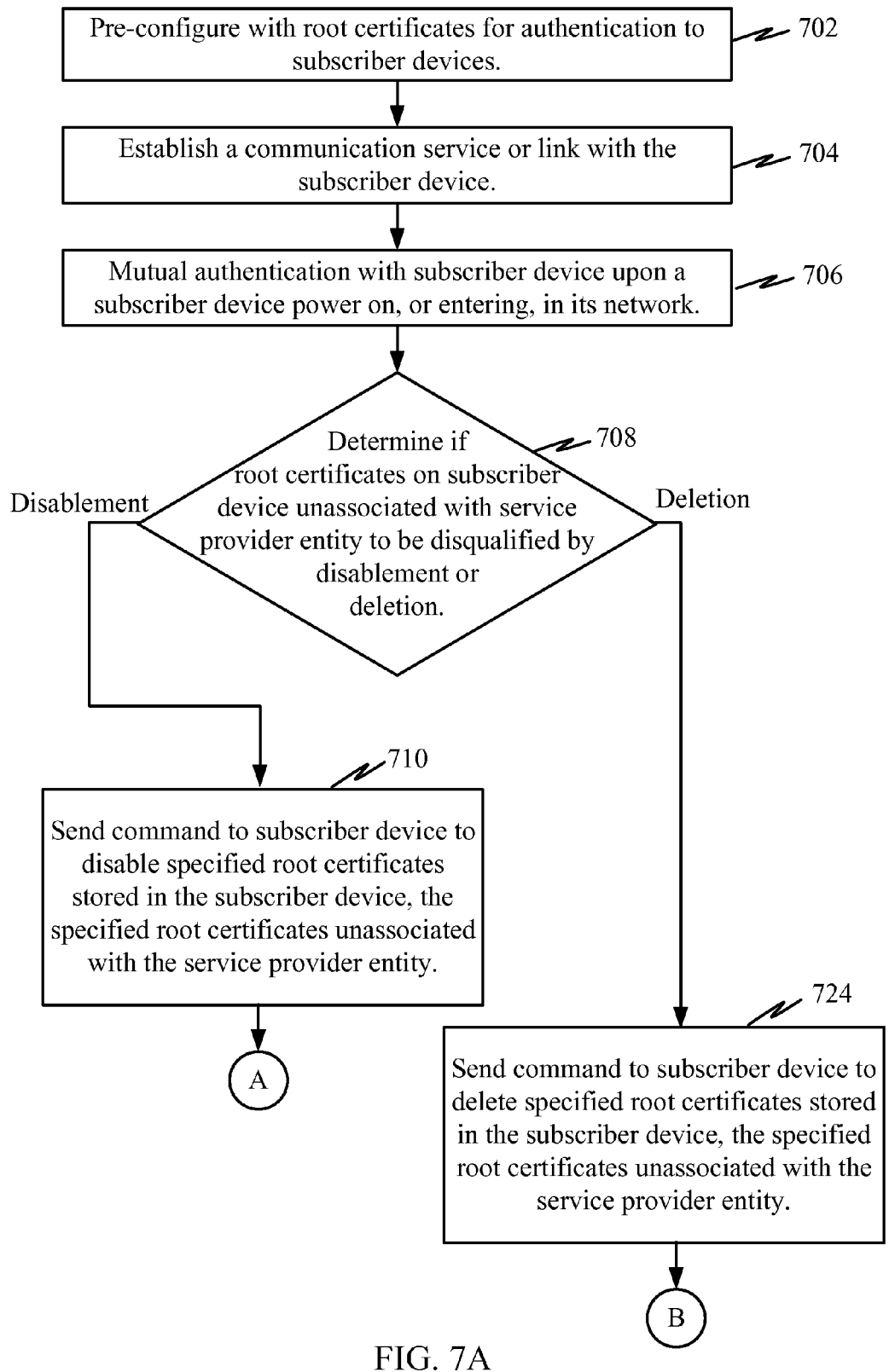
FIG. 7 (comprising FIGS. 7A, 7B and 7C) illustrates an example of the operation of the service provider entity.
Figure 7B:
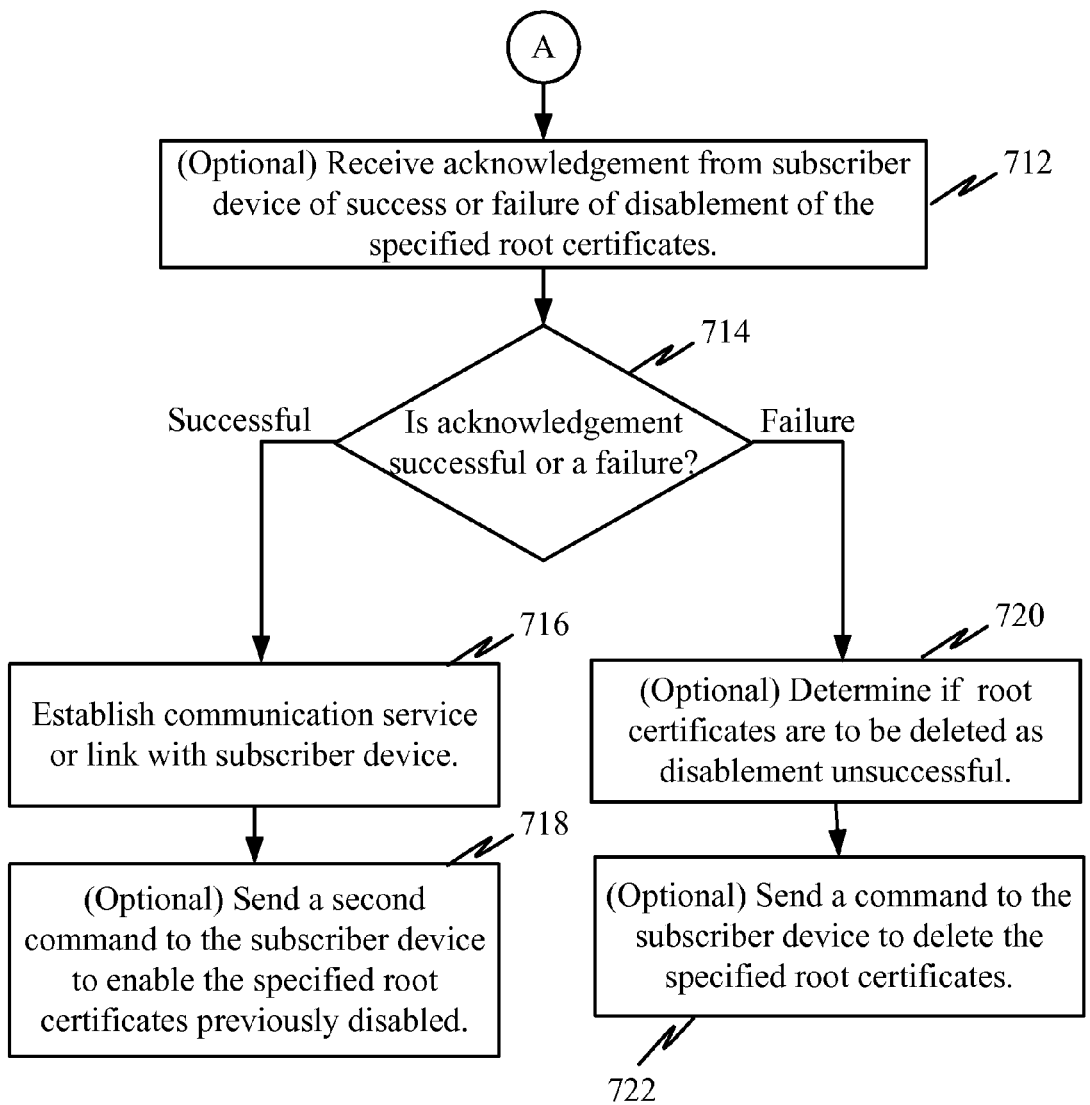
Figure 7C:
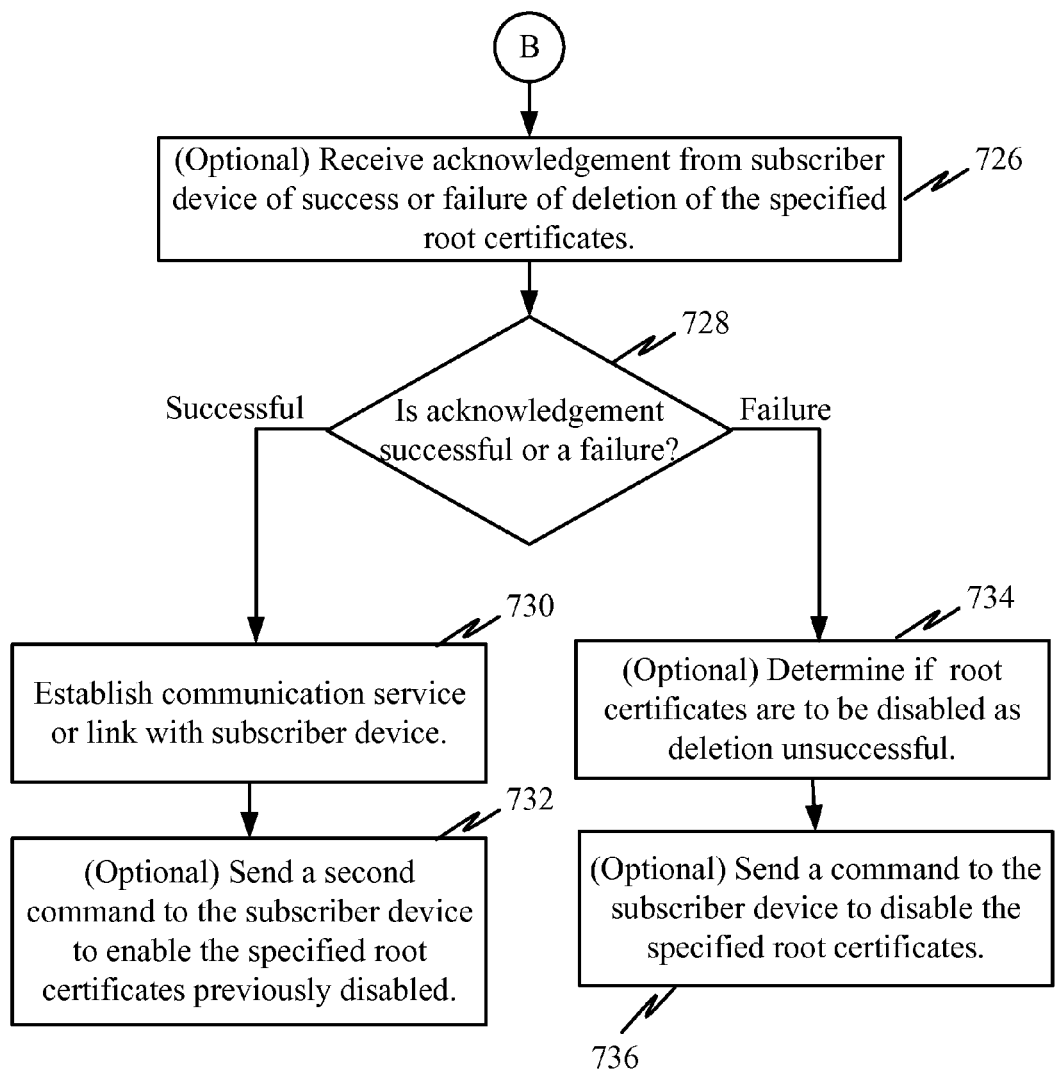

FIG. 7 (comprising FIGS. 7A, 7B and 7C) illustrates an example of the operation of the service provider entity. The service provider entity may include one or more servers and/or modules and may be provisioned (or pre-configured) with root certificates for authenticating subscriber devices 702. When a subscriber device is powered on or enters the network of a service provider entity, a communication service or link may be established with the subscriber device 704. This communication service or link may allow the subscriber device access to low-level services, which as described above, may be restricted to communications occurring below the application layer in a typical protocol stack.

After the communication link has been established, using methods well known in the art, the service provider entity may be mutually authenticated with the subscriber device 706. Once mutual authentication has occurred between the service provider entity and the subscriber device, the service provider entity may determine if the root certificates on the subscriber device unassociated with the service provider entity are to be disabled or deleted 708.

Command Disablement of Specified Root Certificates

If the unassociated root certificates are to be disabled, the subscriber device may send a command (or instructions) to the subscriber device to disable the specified root certificates stored in the subscriber device, the specified root certificates unassociated with the service provider entity 710. The service provider entity may receive an acknowledgement from the subscriber device as to the success or failure of the disablement of the specified root certificates 712. A determination may then be made as to whether the acknowledgement indicates the disablement was successful or was a failure 714. If the specified root certificates were successfully disabled, a communication service or link may then be established with the subscriber device 716 allowing the subscriber device access to higher-level services.

Optionally, the subscriber device may send a second command to the subscriber device to enable the specified root certificates that have been previously disabled 718. In one example, the second command may be sent upon the occurrence of a pre-determined event. The pre-determined event may be, for example, the end of a service contract between the subscriber device and the service provider entity or the payment of an unlocking or early termination fee by the subscriber device to the service provider entity.

Alternatively, if it is determined that the specified root certificates were unsuccessfully disabled 714, the service provider entity may determine if a command is to be sent to the subscriber device instructing the subscriber device to try to delete the specified root certificates 720. If there has not been a previously failed attempt to delete the specified root certificates, the service provider entity may send a command to the subscriber device to delete the specified root certificates 722. Conversely, if there has been a previously failed attempt to delete the specified root certificates, this in combination with the failed attempt to disable the specified root certificates may indicate that there may be a malfunction of the subscriber device and the subscriber device may need to be fixed or replaced.

Command Deletion of Specified Root Certificates

If the service provider entity determines that the root certificates on the subscriber device unassociated with the service provider entity are to be deleted 708, the subscriber device may send a command (or instructions) to the subscriber device to delete the specified root certificates stored in the subscriber device, the specified root certificates unassociated with the service provider entity 724. The service provider entity may receive an acknowledgement from the subscriber device as to the success or failure of the deletion of the specified root certificates 726. A determination may then be made as to whether the acknowledgement indicates the deletion was successful or was a failure 728. If the specified root certificates were successfully deleted, a communication service or link may then be established with the subscriber device 730 allowing the subscriber device access to higher-level services.

Optionally, the subscriber device may send a second command to the subscriber device to replace the specified root certificates that have been previously deleted 732. In one example, the second command may be sent upon the occurrence of a pre-determined event. The pre-determined event may be, for example, the end of a service contract between the subscriber device and the service provider entity or the payment of an unlocking or early termination fee by the subscriber device to the service provider entity.

Alternatively, if it is determined that the specified root certificates were unsuccessfully deleted 728, the service provider entity may determine if a command is to be sent to the subscriber device instructing the subscriber device to try to disable the specified root certificates 734. If there has not been a previously failed attempt to disable the specified root certificates, the service provider entity may send a command to the subscriber device to disable the specified root certificates 736. Conversely, if there has been a previously failed attempt to disable the specified root certificates, this in combination with the failed attempt to delete the specified root certificates may indicate that there may be a malfunction of the subscriber device and the subscriber device may need to be fixed or replaced.

Exemplary Root Certificate/Key Hierarchy

FIG. 10 illustrates an example of a root certificate/key hierarchy. For instance, this may be an Enhanced UMTS Terrestrial Radio Access Network (EUTRAN) key hierarchy. Here, a Universal Subscriber Identity Module (USIM) in the subscriber device, and an Authentication Center (AuC) at the service provider entity, use a root certificate/key (i.e., master key) K to generate a cipher key (CK) and integrity key (IK). The cipher key (CK) and integrity key (IK) may then be used by the subscriber device and a Home Subscriber Server (HSS), at the service provider entity, to generate an Access Security Management Entry key $K_{ASME}$. The security activation in an LTE network may be accomplished through Authentication and Key Agreement procedure (AKA), Non-Access Stratum (NAS) Security Mode Configuration (NAS SMC) and AS Security mode Configuration (AS SMC). AKA is used to derive the key $K_{ASME}$, which is then used as a base key for the calculation of NAS (Non-Access Stratum) keys and AS (Access Stratum) keys. The subscriber device and a Mobility Management Entity (MME), at the network side, may then use the $K_{ASME}$ to generate one or more of these security keys.

It should be recognized that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A subscriber device, comprising:
a memory device;
a network communication interface coupled to the memory device, the network communication interface for providing connectivity to a service provider entity; and
a processing circuit coupled to the memory device and the network communication interface, the processing circuit configured to:
establish a communication service with the service provider entity;
receive a command from the service provider entity to disqualify specified root certificates stored in the subscriber device, the specified root certificates unassociated with the service provider entity; and
disqualify the specified root certificates.

2. The subscriber device of claim 1, wherein the processing circuit is further configured to:
authenticate the subscriber device with the service provider entity; and
authenticate the service provider entity with the subscriber device.

3. The subscriber device of claim 2, wherein the service provider entity is authenticated using a root certificate from among a plurality of pre-configured root certificates in the subscriber device.

4. The subscriber device of claim 1, wherein disqualifying the specified root certificates disables the specified root certificates.

5. The subscriber device of claim 4, wherein the processing circuit is further configured to:
receive a second command from the service provider entity to enable the specified root certificates previously disabled.

6. The subscriber device of claim 5, wherein a determination to send the second command to the subscriber device is made by the service provider entity.

7. The subscriber device of claim 6, wherein the determination is based upon a pre-determined event.

8. The subscriber device of claim 7, wherein the pre-determined event is the termination of a service contract between the subscriber device and the service provider entity.

9. The subscriber device of claim 1, wherein disqualifying the specified root certificates deletes the specified root certificates from the subscriber device.

10. The subscriber device of claim 9, wherein the processing circuit is further configured to:
receive a second command from the service provider entity to replace the specified root certificates previously deleted.

11. A subscriber device, comprising:
means for establishing a communication service with a service provider entity;
means for receiving a command from the service provider entity to disqualify specified root certificates stored in the subscriber device, the specified root certificates unassociated with the service provider entity; and
means for disqualifying the specified root certificates.

* * * * *